US012273672B2

(12) United States Patent
Morimoto et al.

(10) Patent No.: US 12,273,672 B2
(45) Date of Patent: Apr. 8, 2025

(54) LOUDSPEAKER

(71) Applicant: Panasonic Intellectual Property Management Co., Ltd., Osaka (JP)

(72) Inventors: Hiroyuki Morimoto, Osaka (JP); Yuuki Izumi, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 275 days.

(21) Appl. No.: 17/977,288

(22) Filed: Oct. 31, 2022

(65) Prior Publication Data

US 2023/0156384 A1 May 18, 2023

(30) Foreign Application Priority Data

Nov. 15, 2021 (JP) ................................ 2021-185613

(51) Int. Cl.
*H04R 25/00* (2006.01)
*H04R 1/02* (2006.01)

(52) U.S. Cl.
CPC ....... *H04R 1/025* (2013.01); *H04R 2201/021* (2013.01); *H04R 2400/11* (2013.01); *H04R 2499/13* (2013.01)

(58) Field of Classification Search
CPC .............. H04R 1/025; H04R 2201/021; H04R 2400/11; H04R 2499/13; H04R 1/026
USPC .......................................................... 381/386
See application file for complete search history.

(56) References Cited

U.S. PATENT DOCUMENTS

| | | | | |
|---|---|---|---|---|
| 4,660,728 A * | 4/1987 | Martin | H04R 1/026 | 248/323 |
| 4,880,203 A * | 11/1989 | Holcomb | E04G 11/42 | 249/211 |
| 5,819,959 A * | 10/1998 | Martin | H04R 1/026 | 248/323 |
| 7,206,427 B2 * | 4/2007 | Simidian, II | H04R 1/026 | 381/386 |
| 8,126,184 B2 * | 2/2012 | Parker | H04R 1/026 | 381/387 |

FOREIGN PATENT DOCUMENTS

| | | |
|---|---|---|
| JP | 2001-251696 | 9/2001 |

* cited by examiner

*Primary Examiner* — Phylesha Dabney
(74) *Attorney, Agent, or Firm* — Greenblum & Bernstein, P.L.C.

(57) ABSTRACT

A loudspeaker to be attached to an attachment member, the loudspeaker including: a temporary joint pin which is inserted into a temporary joint hole and temporarily holds the loudspeaker in a suspended state. The temporary joint pin includes a rod-like portion backwardly projects from a rear end surface of a frame; a tilted surface portion which is part of an inner circumferential surface of a circumferential surface of the rod-like portion to be brought into contact with the temporary joint hole, and is tilted to become closer to the central axis of the rod-like portion from a base end toward a distal end of the rod-like portion in a direction of projection; and a flanged portion which is adjacent to the tilted surface portion at the distal end of the rod-like portion, protrudes in a direction crossing the direction of projection, and catches onto the attachment member.

8 Claims, 5 Drawing Sheets

LOUDSPEAKER

CROSS REFERENCE TO RELATED APPLICATION

The present application is based on and claims priority of Japanese Patent Application No. 2021-185613 filed on Nov. 15, 2021.

FIELD

The present disclosure relates to a loudspeaker.

BACKGROUND

When a loudspeaker is attached to a plate surface vertically erecting, a worker has to hold the loudspeaker in a predetermined position by one hand, and secure a screw by the other hand. Because of inefficiency of such work, Patent Literature (PTL) 1 discloses a technique of temporarily attaching a loudspeaker with a brimmed pin by inserting the pin into a through hole disposed on the plate surface to prevent drop of the loudspeaker from the plate surface, and then securing the pin.

CITATION LIST

Patent Literature

Patent Literature 1: Japanese Unexamined Patent Application Publication No. 2001-251696

SUMMARY

However, the loudspeaker disclosed in PTL 1 can be improved upon.

In view of this, the present disclosure provides a loudspeaker capable of improving upon the above related art.

The loudspeaker according to one aspect of the present disclosure is a loudspeaker to be attached to an attachment member, the loudspeaker including a temporary joint pin which is inserted into a temporary joint hole provided in the attachment member and temporarily holds the loudspeaker in a suspended state. Here, the temporary joint pin includes a rod-like portion backwardly projecting from a rear end surface of a frame of the loudspeaker; a tilted surface portion which is part of a circumferential surface of the rod-like portion to be brought into contact with an inner circumferential surface of the temporary joint hole, and is tilted to become closer to a central axis of the rod-like portion from a base end of the rod-like portion toward a distal end of the rod-like portion in a direction of projection; and a flanged portion which is adjacent to the tilted surface portion at the distal end of the rod-like portion, protrudes in a direction crossing the direction of projection, and catches onto a rear surface of the attachment member.

The loudspeaker according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Hereinafter, the loudspeaker according to an embodiment of the present disclosure will be described with reference to the drawings. The embodiment shown below is illustrative as examples to describe the present disclosure, and should not be construed as limitations to the present disclosure. For example, shapes, structures, materials, components, relatively positional relations, connection states, numeric values, expressions, contents of steps in methods, order of steps, and the like shown in the embodiment below are exemplary, and may contain contents not described below in some cases. When geometric expressions such as parallel and orthogonal are used, these expressions do not indicate mathematically strict meanings, and contain substantially allowable differences, deviations, and the like. Moreover, expressions such as simultaneous and identical also contain substantially allowable ranges.

The drawings are schematic illustrations appropriately subjected to emphasis, omission, or adjustment of ratios for describing the present disclosure, and are different from actual shapes, positional relations, and ratios.

Hereinafter, a plurality of aspects may be generally described as one embodiment. Part of the contents described below will be described as optional components related to the present disclosure.

Figure 1:
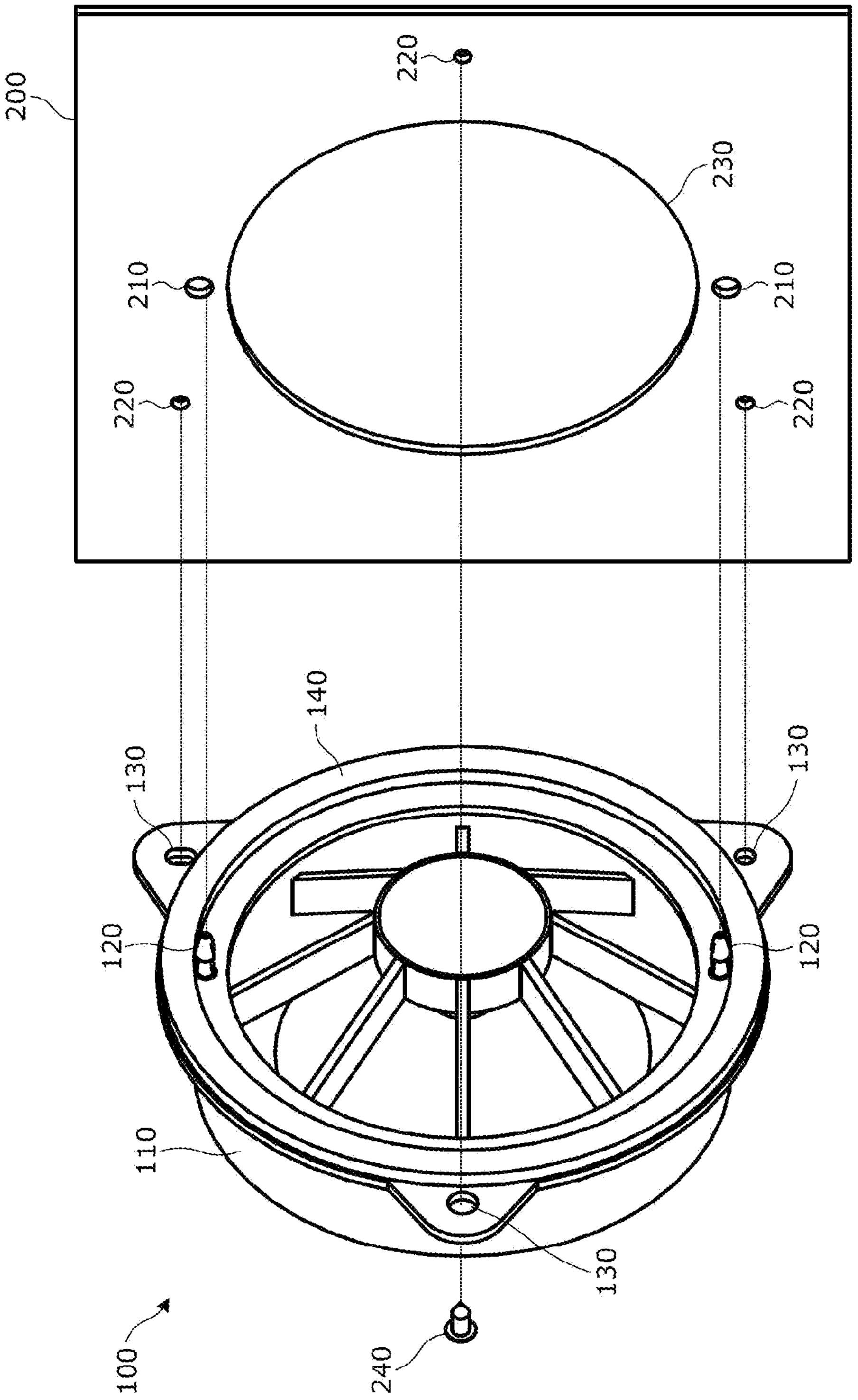
FIG. 1 is an exploded perspective view illustrating the loudspeaker and the attachment member according to an embodiment.

FIG. 1 is a perspective view partially illustrating the loudspeaker and the attachment member according to an embodiment. Attachment member 200 is not particularly limited as long as it is a plate-like member to which loudspeaker 100 is to be attached, and can be made of any material. In the present embodiment, attachment member 200 is an inner wall of a vehicle door, and is made of a sheet metal. Attachment member 200 includes temporary joint hole 210 which is a through hole to which loudspeaker 100 is temporarily attached, fixing hole 220 to which loudspeaker 100 is secured, and insertion hole 230 into which loudspeaker 100 attached is partially inserted.

Loudspeaker 100 is loudspeaker 100 to be attached to attachment member 200, and includes frame 110 and temporary joint pin 120. In the present embodiment, loudspeaker 100 is designed to be attached to erecting plate-like attachment member 200, and includes securing hole 130 and sealing member 140. Although loudspeaker 100 includes a magnetic circuit, a voice coil, a vibration plate, and the like which are standard components for generating sounds, the description thereof will be omitted. In this specification and CLAIMS, the side on which the vibration plate is disposed (the side from which sounds are radiated) is defined as front and the side on which a magnetic circuit is disposed is defined as rear.

Frame 110 is a member which holds a magnetic circuit and a vibration plate and serves as a structural base for loudspeaker 100. Examples of the shape of frame 110 include, but should not be limited to, a cylindrical shape and a prismatic shape. In the present embodiment, frame 110 is approximately cylindrical. Frame 110 can be made of any material. In the present embodiment, a resin is used. Frame 110 is formed by injection molding.

Temporary joint pin 120 is inserted into temporary joint hole 210 provided in attachment member 200, and temporarily holds loudspeaker 100 in a suspended state. In the present embodiment, temporary joint pin 120 is made of a resin, and is integrally formed with frame 110.

Figure 2:
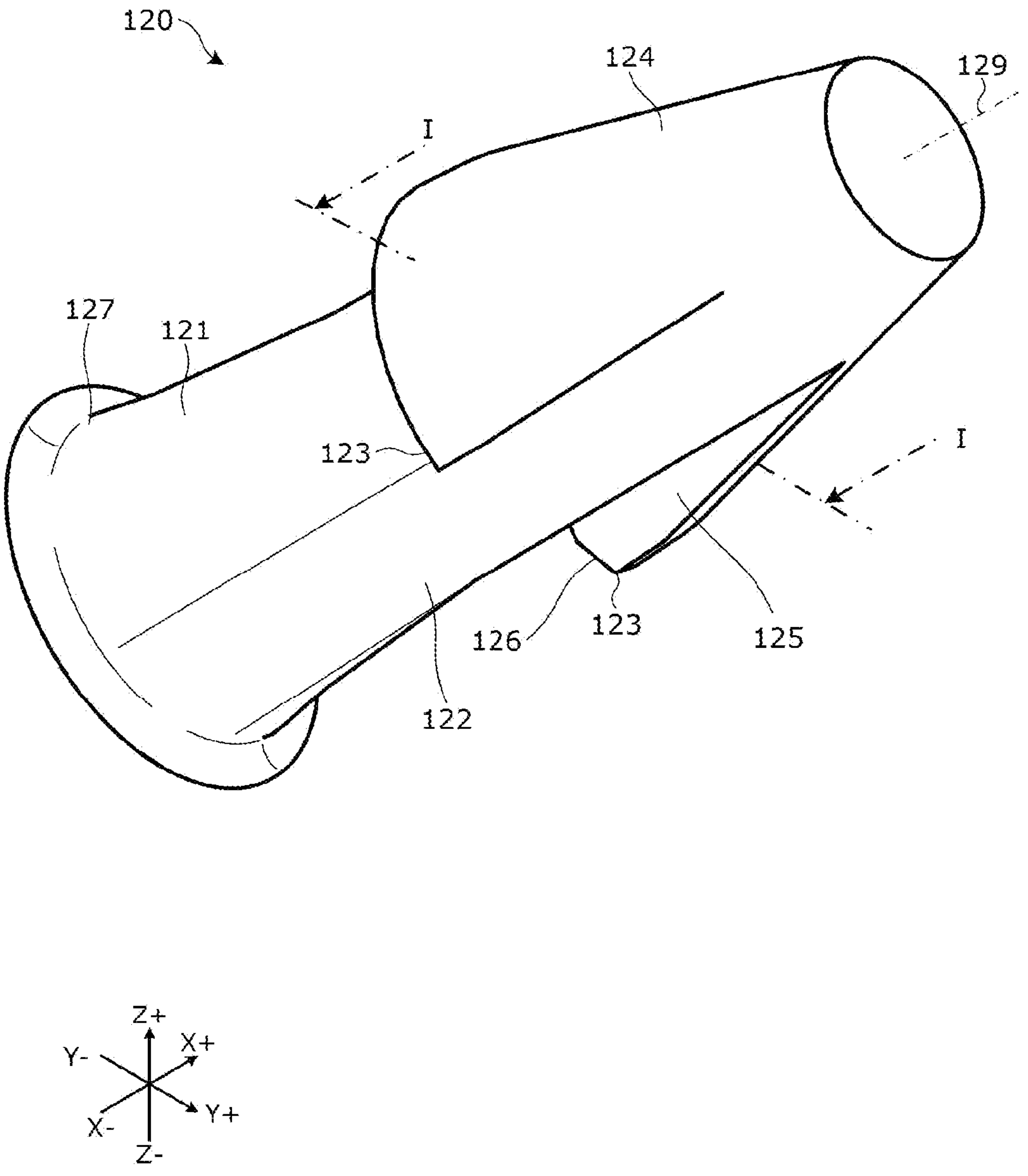
FIG. 2 is a perspective view illustrating the temporary joint pin according to the embodiment.

FIG. 2 is a perspective view illustrating the temporary joint pin. Temporary joint pin 120 includes rod-like portion 121, tilted surface portion 122, and flanged portion 123. In the present embodiment, temporary joint pin 120 includes conical portion 124, notch 125, tapered portion 126, and reinforcing portion 127.

Rod-like portion 121 backwardly projects from the rear end surface of frame 110, namely, projects in a direction allowing insertion into temporary joint hole 210 when loudspeaker 100 is attached to attachment member 200, and serves as a structural base for temporary joint pin 120. Rod-like portion 121 can be in any shape. In the present embodiment, rod-like portion 121 is cylindrical, and includes reinforcing portion 127 having a cross-sectional area orthogonal in the direction of projection, the cross-sectional area increasing toward a portion of the base end connected to the rear end surface of the frame.

Tilted surface portion 122 is part of the circumferential surface of rod-like portion 121 to be brought into contact with the inner circumferential surface of temporary joint hole 210, and is a surface tilted to become closer to central axis 129 of rod-like portion 121 from the base end side (frame side) toward the distal end side in the direction of projection (X+ direction in FIG. 2).

Figure 3:
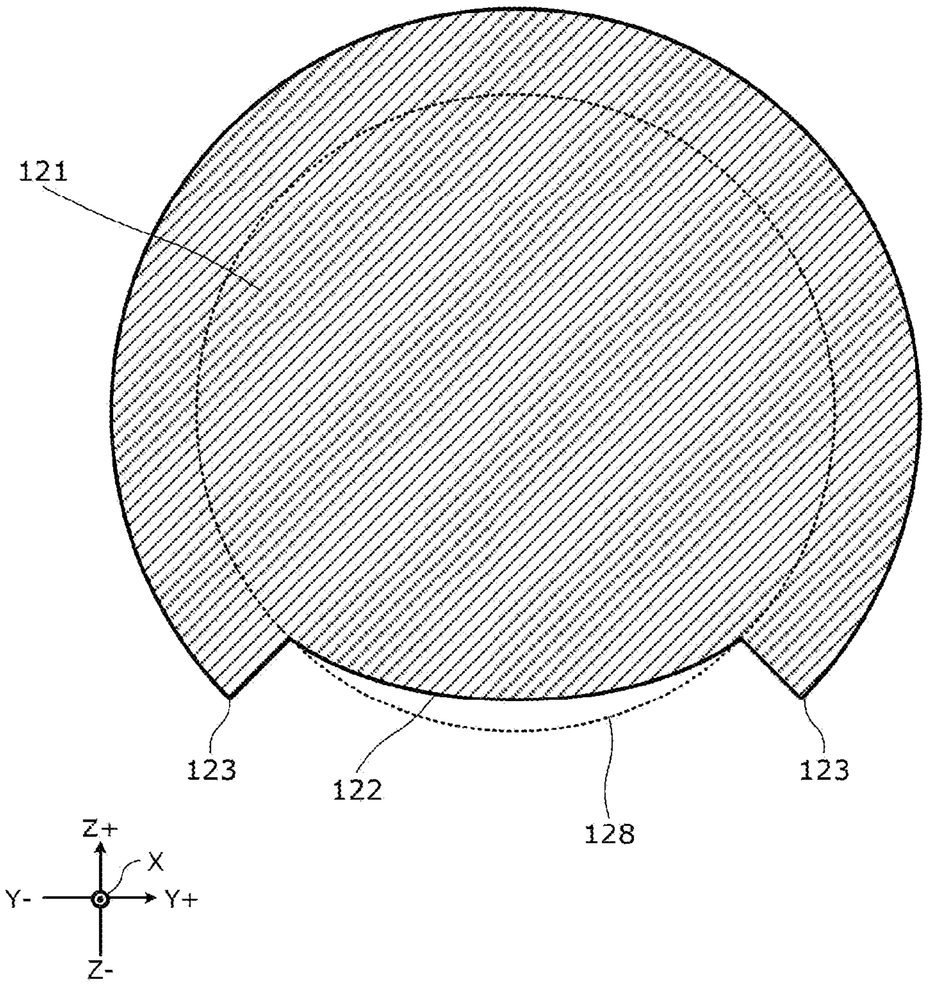
FIG. 3 is a diagram illustrating a cross-section of the temporary joint pin taken along line I-I illustrated in FIG. 2.

FIG. 3 is a diagram illustrating a cross-section of the temporary joint pin taken alone line I-I shown in FIG. 2. In the present embodiment, tilted surface portion 122 is configured with a curved surface disposed on an inner side with respect to virtual outer circumferential surface 128, which is a virtually extended outer circumferential surface of rod-like portion 121. Tilted surface portion 122 is disposed to face the inner side of loudspeaker 100, and to be brought into contact with the inner circumference of temporary joint hole 210 when loudspeaker 100 is temporarily attached and suspended. This state is established at least from flanged portion 123 to a region near the base end of flanged portion 123. Such a configuration can increase the region of flanged portion 123 which catches onto attachment member 200 when loudspeaker 100 is temporarily attached to attachment member 200. Tilted surface portion 122 may be a flat surface.

Flanged portion 123 is a portion which is adjacent to tilted surface portion 122 at the distal end of rod-like portion 121, protrudes in a direction crossing the direction of projection (X-axial direction in the drawing), and catches onto the rear surface of attachment member 200. In the present embodiment, flanged portion 123 is part of an annular portion having a rectangular cross-section with a notch corresponding to tilted surface portion 122, and is disposed on both sides of tilted surface portion 122 in the circumferential direction. The interval between two flanged portions 123 is preferably less than 180 degrees with respect to central axis 129 of rod-like portion 121 as the center. When the interval is greater than or equal to 180 degrees, the amount of flanged portion 123 to catch onto attachment member 200 is significantly reduced, leading to difficulties in temporary attachment. The interval is preferably selected from the range of 60 degrees or more and 90 degrees or less. Flanged portion 123 having an interval of less than 60 degrees results in a significantly complicated structure of a metal mold used to integrally form frame 110 and temporary joint pin 120 by injection molding. Flanged portion 123 having an interval of greater than 90 degrees reduces the amount of flanged portion 123 to catch onto attachment member 200, increasing a risk of releasing the temporary attachment when loudspeaker 100 is temporarily attached to attachment member 200.

Conical portion 124 includes a bottom surface including flanged portion 123 as part thereof, is tapered in the direction of projection, and includes notch 125 corresponding to tilted surface portion 122. In the present embodiment, flanged portion 123 is in an annular shape partially notched, and conical portion 124 is in a shape of a truncated cone. Conical portion 124 can facilitate insertion of temporary joint pin 120 into temporary joint hole 210 during temporary attachment. Moreover, notch 125 (corresponding to tilted surface portion 122) disposed in conical portion 124 can ensure continuity of tilted surface portion 122 in the direction of projection, and can improve the releasing properties of the metal mold during injection molding.

Tapered portion 126 is a portion disposed to become closer to rod-like portion 121 from flanged portion 123 toward the base end, and includes a notch corresponding to tilted surface portion 122. Such a configuration can prevent damage of temporary joint pin 120 and attachment member 200, which is caused by flanged portion 123 caught by attachment member 200 when loudspeaker 100 is removed from attachment member 200. This facilitates the removal of loudspeaker 100 from attachment member 200, and enables temporary reattachment of loudspeaker 100.

In the present embodiment, loudspeaker 100 includes a plurality of (two in the present embodiment) temporary joint pins 120 arranged symmetric with respect to a plane. For example, when one loudspeaker 100 is temporarily attached to any one of left and right doors of a vehicle, such a configuration enables temporary attachment using one of temporary joint pins 120. By inserting the plurality of temporary joint pins 120 into their corresponding temporary joint holes 210, a function to position securing hole 130 with respect to fixing hole 220 provided in attachment member 200 can be demonstrated, and a task of attaching loudspeaker 100 can be easily performed. Desirably, the symmetric plane for the plurality of temporary joint pins 120 passes through the winding axis of the voice coil. In such a configuration, when loudspeaker 100 is temporarily attached to one of the left and right doors, the weight can be balanced to some extent between the left and right doors. Moreover, sounds can be symmetrically radiated from loudspeakers 100 attached to left and right doors.

Securing hole 130 is a through hole used in main attachment of loudspeaker 100 to attachment member 200 by inserting and securing member 240 or the like. In the present embodiment, a plurality of securing holes 130 are provided symmetric with respect to the symmetric plane for the plurality of temporary joint pins 120. In such a configuration, loudspeakers 100 identical in shape can be attached to the left and right doors.

Sealing member 140 is an annular member which is disposed between loudspeaker 100 after the main attachment and attachment member 200 and seals the gap between the rear end surface of frame 110 and attachment member 200.

Sealing member 140 demonstrates the sealing function in the state where sealing member 140 is compressed by a clamping force of securing member 240. The thickness of sealing member 140 in a non-compressed state is set to be substantially identical to or smaller than the distance from the rear end surface of the frame to flanged portion 123. Such a configuration can prevent temporary joint pin 120 from coming off from temporary joint hole 210 by the elastic force of sealing member 140 during the temporary attachment.

In loudspeaker 100 according to the present embodiment, workability can be improved because in the temporary attachment task, temporary joint pin 120 can be inserted into temporary joint hole 210 in attachment member 200 without forcing it into temporary joint hole 210. Temporary joint pin 120 does not interfere with temporary joint hole 210, and thus the securing force in the main attachment is not negatively affected. Thus, rise of frame 110 from attachment member 200 and leakage of water caused by insufficient compression of sealing member 140 can be prevented.

Figure 4:
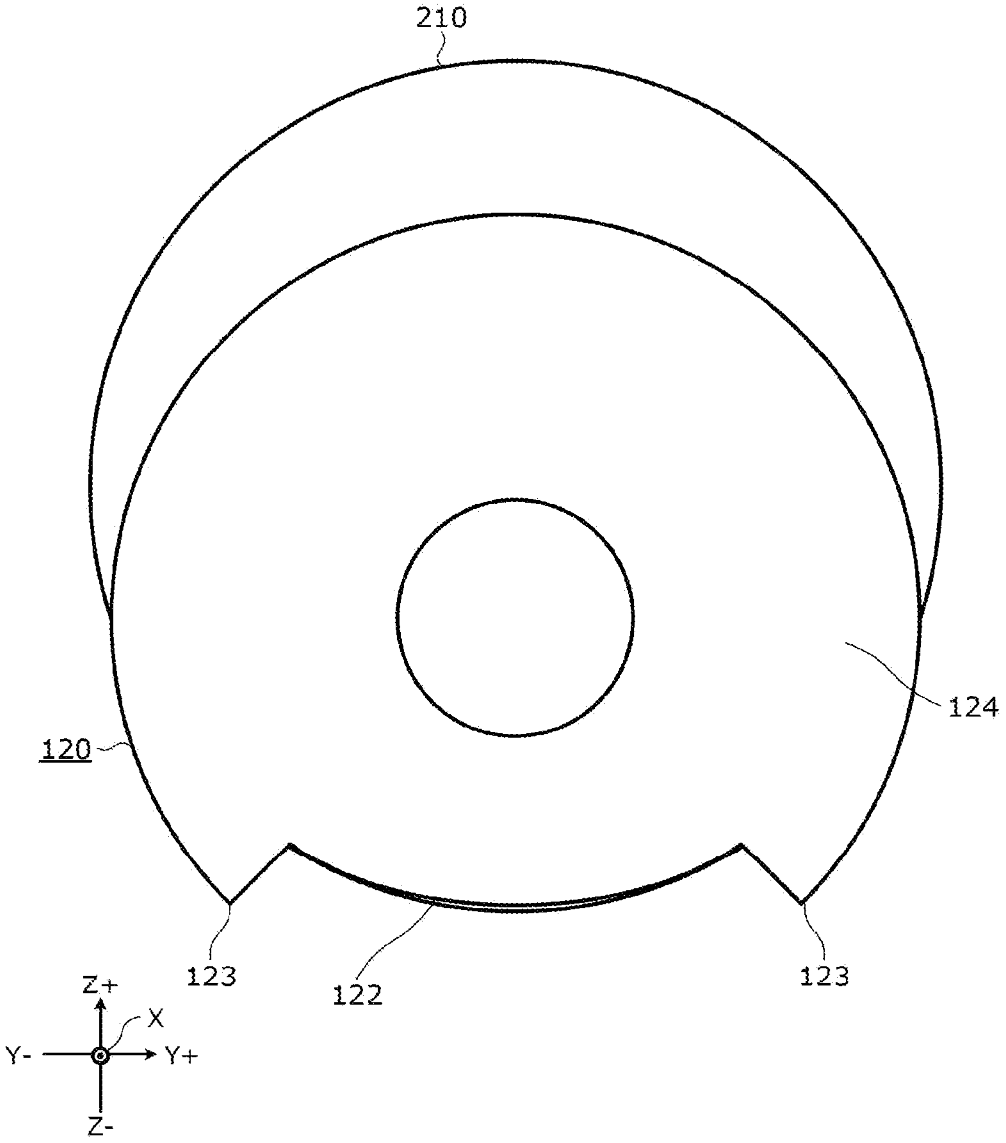
FIG. 4 is a diagram illustrating the temporary joint pin inserted into the temporary joint hole in the attachment member when viewed from the rear of the attachment member.

Flanged portion 123 protruding from rod-like portion 121 is not present in the portion corresponding to tilted surface portion 122. For this reason, the metal mold used for injection molding of frame 110 can be simplified, and as illustrated in FIG. 4, flanged portion 123 can sufficiently catch onto attachment member 200 in the state where temporary joint pin 120 is inserted into temporary joint hole 210 to suspend loudspeaker 100.

Because temporary joint pin 120 has a size to be loose fitted into temporary joint hole 210, a wide range of fluctuation in size caused in attachment member 200 can be allowed. Furthermore, because temporary joint hole 210 into which temporary joint pin 120 in the related art is press fitted for positioning can be used, loudspeaker 100 can be attached to existing attachment member 200 without changing the structure of existing attachment member 200.

It should be noted that the present disclosure is not limited to the above embodiment. For example, another embodiment implemented by optionally combining the components described in this specification or by removing some of the components may be an embodiment according to the present disclosure. The present disclosure also covers modifications obtained by subjecting the above embodiment to a variety of modifications conceived by persons skilled in the art without departing from the gist of the present disclosure, that is, the meanings represented by expressions in CLAIMS.

For example, although loudspeaker 100 including two temporary joint pins 120 has been exemplified in the embodiment, the number of temporary joint pins 120 may be one or may be three or more.

Figure 5:
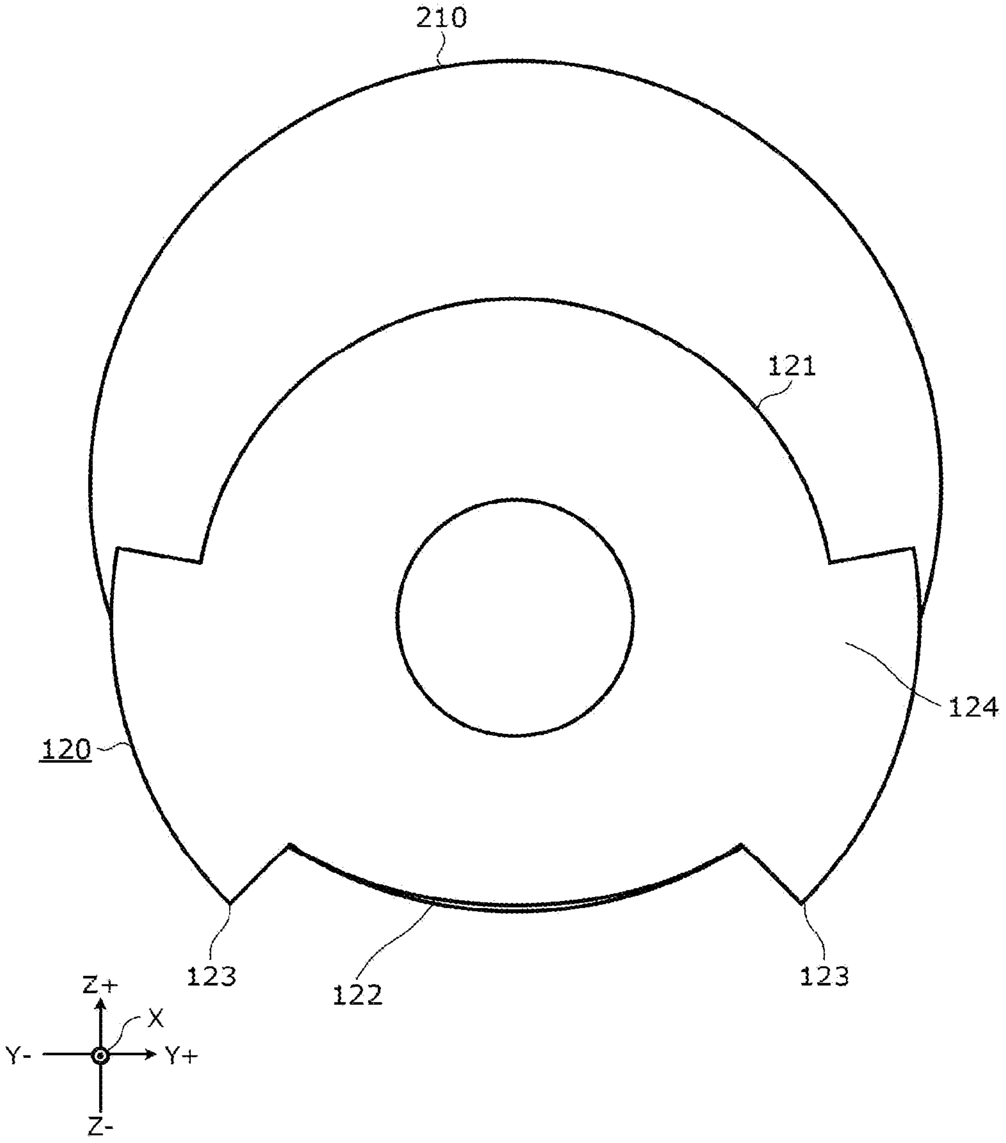
FIG. 5 is a diagram illustrating another example of the temporary joint pin inserted into the temporary joint hole in the attachment member when viewed from the rear of the attachment member.

Moreover, flanged portion 123 may be not only in an annular shape including a notch corresponding to tilted surface portion 122, but also in a shape such that a portion not catching onto attachment member 200 in the temporarily attached state is not present. For example, flanged portion 123 may include a notch at least partially including a region of tilted surface portion 122 rotationally symmetric with respect to central axis 129 as illustrated in FIG. 5.

Moreover, although a case where loudspeaker 100 is attached to attachment member 200 disposed within a vertical plane has been described, loudspeaker 100 may be attached to attachment member 200, which is erected while being tilted.

While various embodiments have been described herein above, it is to be appreciated that various changes in form and details may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2021-185613 filed on Nov. 15, 2021.

INDUSTRIAL APPLICABILITY

The present disclosure can be used in loudspeakers.

The invention claimed is:

1. A loudspeaker to be attached to an attachment member, the loudspeaker comprising:

a temporary joint pin which is provided on a rear end surface of a frame of the loudspeaker and is inserted into a temporary joint hole provided in the attachment member and temporarily holds the loudspeaker in a suspended state, wherein the temporary joint pin includes:

a rod-like portion projecting from the rear end surface of the frame of the loudspeaker, the rod-like portion including a tilted surface on a circumferential surface thereof; and a conical portion that is provided at a distal end of the rod-like portion and is tapered in a direction of projection of the rod-like portion, the conical portion including a bottom surface at the distal end of the rod-like portion and a notch on a tapered circumferential surface of the conical portion, the tilted surface is to be brought into contact with an inner circumferential surface of the temporary joint hole, and is tilted to become closer to a central axis of the rod-like portion from a base end of the rod-like portion toward the distal end of the rod-like portion in the direction of projection such that a cross-sectional area of the rod-like portion is reduced from the base end to the distal end, the bottom surface of the conical portion includes a flanged portion which protrudes in a direction crossing the direction of projection, and catches onto a rear surface of the attachment member, the tilted surface of the rod-like portion continues to a bottom face of the notch of the conical portion at the distal end of the rod-like portion, an area of the bottom surface of the conical portion is larger than the cross-sectional area of the rod-like portion at the base end, and an inclination of the tilted surface of the rod-like portion is smaller than an inclination of the tapered circumferential surface of the conical portion.

2. The loudspeaker according to claim 1, wherein the rod-like portion is cylindrical, and the tilted surface is disposed on an inner side with respect to a virtual outer circumferential surface of the rod-like portion.

3. The loudspeaker according to claim 1, wherein the flanged portion is disposed on both sides of the tilted surface in a circumferential direction.

4. The loudspeaker according to claim 1, further comprising:

another temporary joint pin which is plane symmetric with respect to the temporary joint pin.

5. The loudspeaker according to claim 4, further comprising:

a plurality of securing holes which are symmetrically provided with respect to a symmetric plane for the temporary joint pins and secures the loudspeaker to the attachment member.

6. The loudspeaker according to claim 1, wherein the temporary joint pin includes a tapered portion disposed to become closer to the rod-like portion from the flanged portion toward the base end of the rod-like portion.

7. The loudspeaker according to claim 1, wherein the rod-like portion includes a reinforcing portion having a cross-sectional area increasing toward the base end of the rod-like portion.

8. The loudspeaker according to claim 1, wherein the tilted surface is a flat surface.

* * * * *